United States Patent

[11] 3,573,578

| | | |
|---|---|---|
| [72] | Inventor | Fukuo Shibata<br>No. 3-22 Tokiwa-cho, Nishinomiya, Japan |
| [21] | Appl. No. | 834,311 |
| [22] | Filed | June 18, 1969 |
| [45] | Patented | Apr. 6, 1971 |
| [32] | Priority | June 19, 1968, July 13, 1968, Sept. 24, 1968, Nov. 18, 1968 |
| [33] | | Japan |
| [31] | | 43-42706, 43-49504, 43-68936 and 43-84381 |

[54] ELECTRIC MACHINE ARRANGEMENTS INCLUDING ELECTRIC ROTATING MACHINES
10 Claims, 14 Drawing Figs.

[52] U.S. Cl. .................................................. 318/185,
318/186, 318/189, 322/93
[51] Int. Cl. ............................................. H02p 7/36
[50] Field of Search............................................ 318/178,
184, 185, 186, 189; 322/25, 59, 93

[56] References Cited
UNITED STATES PATENTS

| | | | |
|---|---|---|---|
| 2,208,416 | 7/1940 | Friedlander et al........... | 322/59 |
| 3,074,002 | 1/1963 | Potter........................... | 322/25 |
| 3,130,360 | 4/1964 | Churilow....................... | 322/25 |
| 3,254,293 | 5/1966 | Steinbruegge et al. ....... | 322/59X |
| 3,411,068 | 11/1968 | Krebs........................... | 322/59X |

*Primary Examiner*—Benjamin Dobeck
*Assistant Examiner*—Gene Z. Rubinson

ABSTRACT: When terminals in each phase of primary and secondary winding of a transformer are respectively electrically connected with a middle point and both terminals in each phase of armature stator winding of an electric rotating machine so that electric power can be transferred between the transformer and the rotating machine, two kinds of currents can flow simultaneously in the armature winding, therefore two different numbers of poles can be produced simultaneously in the stator; and the machine can operate as two rotating machines, when the machine has two kinds of rotor windings.

INVENTOR
Fukuo Shibata

INVENTOR
Fukuo Shibata

Inverter or Frequency Converter

INVENTOR
Fukuo Shibata

INVENTOR
Fukuo Shibata

INVENTOR
Fukuo Shibata

ELECTRIC MACHINE ARRANGEMENTS INCLUDING ELECTRIC ROTATING MACHINES

The invention described herein relates to electric machine arrangements which include electric rotating machines having stators and rotors. The following machines are shown as examples of the electric rotating machines.

1. Synchronous machines including generators and motors
2. Induction machines including generators and motors
3. Commutatorless motors In the usual synchronous generator or motor installation a separate direct current generator is used for supplying the field excitation for the synchronous machine.

In some cases, the exciter is housed in a separate structure while in others, the magnetic cores of the exciter and the synchronous machine are enclosed in the same frame. In either event, commutator and slipring assemblies are required for collecting and transferring currents to obtain the desired operation. Motor manufactures have improved the excitation systems for synchronous machines to an extent where the sliding contacts of the commutators and sliprings have been completely eliminated.

These improved synchronous generators still use separate magnetic cores for the exciter and generator windings. Sliding contacts have been eliminated to supply true brushless operation but the separate magnetic core components still exist thus providing essentially the same kind of operation involving substantially the same manufacturing costs. Where a separate stator and rotor core is used, the single rotor winding cannot efficiently perform its intended functions. A prior art example of such an improved system is one wherein the DC voltage for the field winding of a synchronous generator is supplied by a separate polyphase exciter winding, rather than from a separate DC source. This polyphase exciter winding is mounted on the same shaft as the synchronous generator field winding and the stator cores for both machines are placed side by side in a single housing. Upon rotation of the shaft, the polyphase alternating voltage output from the exciter is rectified by shaft mounted rectifiers and supplied to the main generator field winding on the rotor to furnish the needed direct current flow therein.

Another prior art example of an improved system for providing a brushless synchronous generator of inexpensive construction is one wherein is provided a brushless synchronous generator comprising a shaft-mounted rotor arranged for rotation in a stator, conductor slots in each of the rotor and stator, a multipole generator output winding comprising conductors mounted in the stator slots, a multipole exciter field winding comprising conductors located in the same slots as the conductors of the generator output winding, said generator output and exciter field windings being wound to be mutually noninductive and thereby providing zero effective flux linkage between them, a multipole generator filed winding comprising conductors mounted in the rotor slots, a multipole exciter secondary winding comprising conductors located in the same slots as the conductors of the generator field winding, said generator field and exciter secondary windings also being wound to be mutually noninductive and thereby providing zero effective flux linkage between them, and rectifier means mounted on the rotor for supplying unidirectional current flow from the exciter secondary winding to the generator field winding. Thus, the two separate sets of rotor and stator cores which may be mounted within or outside of a single frame can be eliminated in the brushless synchronous generator. However, the stator of the synchronous generator is provided with two kinds of windings and the construction becomes complicated.

An object of this invention is to provide a brushless synchronous machine of inexpensive and simple construction capable of providing optimum performance characteristics.

In a prior art example of an induction machine control arrangement, there is an induction machine construction which contains two stator and two rotor windings rotating mechanically together with each other. In the prior arrangement, controlled rectifiers are connected electrically between terminals of the two rotor windings, for controlling the speed of the machine. In this case also, the stator of the induction machine is provided with two kinds of windings and the construction becomes complicated.

Another object of this invention is to provide a speed control system of an induction machine of inexpensive and simple construction.

In the control of frequencies of generators it is important to keep constant frequencies of generators which are driven by prime movers at speeds not always constant. So, it is further another object of this invention to provide a control system keeping a constant frequency of an induction generator of inexpensive and simple construction.

The matter described heretofore can be applied to a commutatorless motor also. Therefore, still another object of this invention is to provide a speed control system of a commutatorless motor of inexpensive and simple construction.

This invention possesses many other advantages, and has other objects which may be made more clearly apparent from a consideration of several embodiments of this invention. For this purpose, there are shown a few forms in the drawings accompanying and forming part of the present specification. These forms will now be described in detail, illustrating the general principles of the invention, but it is to be understood that this detailed description is not to be taken in a limiting sense, since the scope of the invention is best defined by the appended claims.

Referring to the drawings:

FIGS. 1 to 4 and FIGS. 6, 7, 10, 11, 12, 13, 14 inclusive are system diagrams illustrating different forms of this invention;

This invention is composed of the following combination:

an electric rotating machine having a stator which is provided with an armature winding and having a rotor which is provided with a rotor winding;

a transformer which has a primary winding and a secondary winding; an electric circuit in which the said armature winding of the electric rotating machine is connected electrically in series with the said secondary winding of the transformer by connecting electrically in each phase between both terminals of the said armature winding of the electric rotating machine and both terminals of the said secondary winding of the transformer, so that electric power may be transferred between the said electric rotating machine and the said transformer;

and an electric connection in each phase between a terminal of the said primary winding of the transformer and a middle point of the armature winding of the said electric rotating machine.

Figure 1:
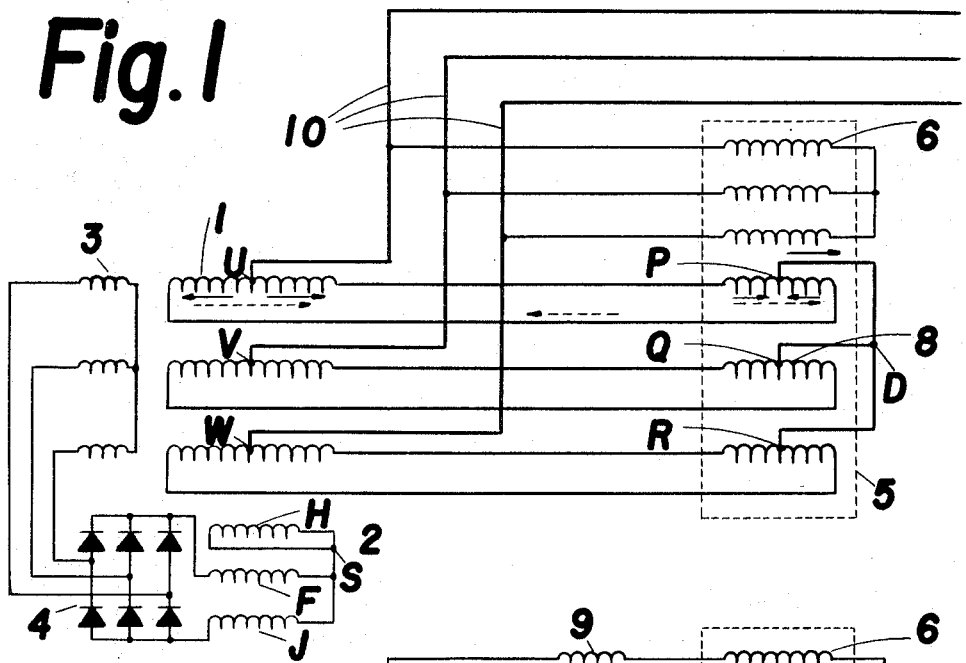

In FIG. 1, an electric rotating machine is composed of a stator which is provided with an armature winding 1 and a rotor which is provided with an exciting winding 3 and a field winding 2. These exciting winding 3 and field winding 2 form rotor windings. A transformer 5 which has a primary winding 6 and a secondary winding 8 is shown in FIG. 1. An electric circuit shown by dotted lines is made by connecting electrically the armature winding 1 of the electric rotating machine in series with the secondary winding 8 of the transformer 5. Both terminals in each phase of the armature winding 1 of the electric rotating machine are electrically connected with both terminals in each phase of the secondary winding 8 of the transformer 5, so that electric power may be transferred between the electric rotating machine and the transformer. The primary winding 6 of the transformer 5 is electrically connected with the armature winding 1 of the electric rotating machine. When the electric rotating machine is a synchronous generator, the primary winding 6 of the transformer is supplied with electric power from the electric rotating machine. When the electric rotating machine is a synchronous motor, the primary winding 6 of the transformer is supplied with electric power from another electric source through the electric wiring 10. A middle point U of the armature winding 1 of the electric rotating machine is connected with the said electric wiring 10. In this case, the middle point U is a terminal of the electric rotating machine. In FIG. 1, the electric rotating machine is a polyphase winding machine. Therefore, each electric circuit, shown by dotted lines, including respectively each phase armature winding and each phase secondary winding of the transformer 5 is made by connecting electrically each phase armature winding of the polyphase electric rotating machine in series with each phase secondary winding of a polyphase transformer 5; each middle point U, V, W of each phase armature winding 1 is connected electrically respectively with each phase primary winding 6 of the transformer 5 through the electric wiring 10; and middle points P, Q, R in each phase secondary winding of the transformer 5 are connected electrically with each other.

In FIG. 1, terminals U, V, W of the electric rotating machine are respectively middle points of the armature winding of the machine, and the connection becomes a double star connection of winding. Solid lines in FIG. 1 show a momentary load current of the electric rotating machine. As the load current cancels each other in the secondary winding 8 of the transformer 5, the secondary winding of the transformer 5 does not act as an inductance for the load current of the electric rotating machine. Therefore, seeing from a view point of load current of the electric rotating machine, the secondary winding 8 of the transformer 5 is neglected; and a point D becomes a neutral point of the double star connection. As the primary winding 6 of the transformer 5 is supplied with electric power from the electric rotating machine or other electric source, an electromotive force shown by dotted line in the secondary winding 8 of the transformer 5 is induced in the secondary winding 8 of the transformer 5. An exciting current flows in the armature winding 1 of the electric rotating machine by the electromotive force induced in the secondary winding of the transformer, as shown by the dotted lines. As is understood from the above description, two different kinds of currents flow in the armature winding 1 of the electric rotating machine simultaneously. Consequently, the number of poles of the armature winding 1 of the electric rotating machine obtained by the load current flowing in the electric rotating machine (shown by the solid lines) can be presented simultaneously with the other number of poles of the armature winding of the electric rotating machine obtained by the current (shown by the dotted lines) which is made to flow in the armature winding 1 of the electric rotating machine by the electromotive force induced in the secondary winding 8 of the transformer 5. The above load current shown by the solid lines flows into and out from the middle point U, V, W in each phase of the armature winding 1 of the electric rotating machine. As the load current is AC it flows into the middle point U, V, W at an instant, and it flows out from the middle point U, V, W to the electric wiring 10, whether the electric rotating machine is a generator or a motor.

In FIG. 1, the rotor is provided with; a multipole field winding 2 comprising conductors mounted in the rotor slots, and having the same number of poles as that of the armature winding of the electric rotating machine obtained by a load current flowing into and out from the middle point in each phase of the armature winding of the electric rotating machine; a multipole exciting secondary winding 3 comprising conductors located in the same slots as the conductors of the field winding, and having the same number of poles as that of the armature winding of the electric rotating machine obtained by the current which is made to flow in the armature winding of the electric rotating machine by the electromotive force induced in the secondary winding of the transformer; and rectifier means 4 mounted on the rotor for supplying unidirectional current flow from the exciting secondary winding 3 to the field winding 2. The field winding 2 is composed of a three phase winding H, F and J. The two phase winding F and J is used for direct current winding, and the other winding H is used as a damper winding. The winding H is shorted by the point S.

Figure 9:
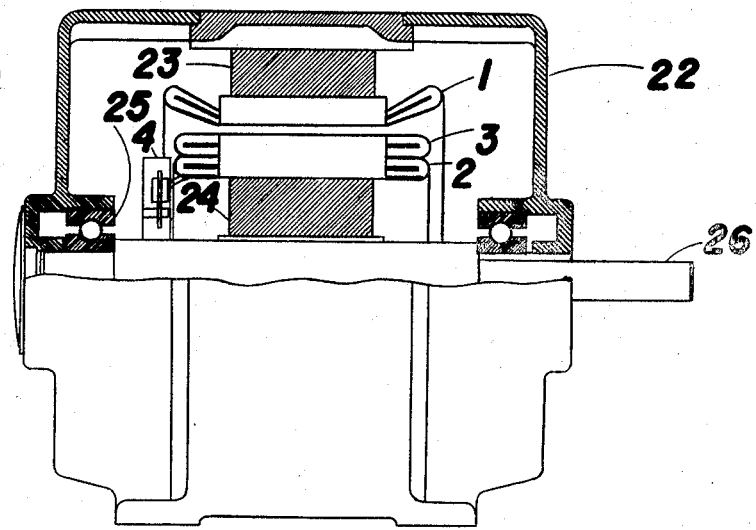
FIG. 9 is a view in elevation, partly in section, of an electric rotating machine of this invention.

There is shown in FIG. 9 a brushless synchronous generator or motor comprising a frame 22 enclosing a stator core 23 consisting of silicon steel stampings. The stator core is slotted in the usual manner for receiving bar or wound conductors of the armature winding 1 of the generator or motor. The rotor core 24 likewise consists of a number of steel stampings pressed onto a shaft 26 arranged for rotation in bearings 25 held in position by end shields. Each rotor slot is made deeper than usual for receiving the conductors of the exciting secondary winding 3 and the field winding 2 of the generator or motor. The conductors of the exciting secondary winding 3 may be embedded in slots position deeper than the field winding 2. When the electric rotating machine is a synchronous generator, the exciting secondary winding 3 has eight poles and the rotor turns at 1800 r.p.m., a 120 cycle, three phase voltage is generated in the eight-pole exciter secondary winding 3. In order to provide DC current for the four-pole generator field winding 2, which is located in the same slots as the eight-pole exciting secondary winding 3, a three phase rectifier 4 is connected to the output of the eight-pole exciting secondary winding 3. This produces the main rotating four-pole field in the airgap which is stationary with respect to the rotor. The four-pole field thus induced a 60 cycle, three phase voltage in the four-pole generator output winding 1 in the stator. The four-pole flux does not induce a voltage in the eight-pole winding and the eight-pole flux does not induce a voltage in the four-pole winding. In this case, the number of poles of the armature winding 1 of the electric rotating machine obtained by the load current (shown by the solid lines) flowing in the electric rotating machine is also four pole, and the number of poles of the armature winding 1 of the electric rotating machine obtained by the current which is made to flow in the armature winding of the electric rotating machine by the armature winding of the electric rotating machine by the electromotive force (shown by the dotted lines) induced in the secondary winding of the transformer is eight pole. Therefore, the eight pole of the armature winding 1 interacts with the eight-pole exciter secondary winding 3, and four pole of the armature winding 1 interacts with the four-pole generator field winding 2.

Figure 2:
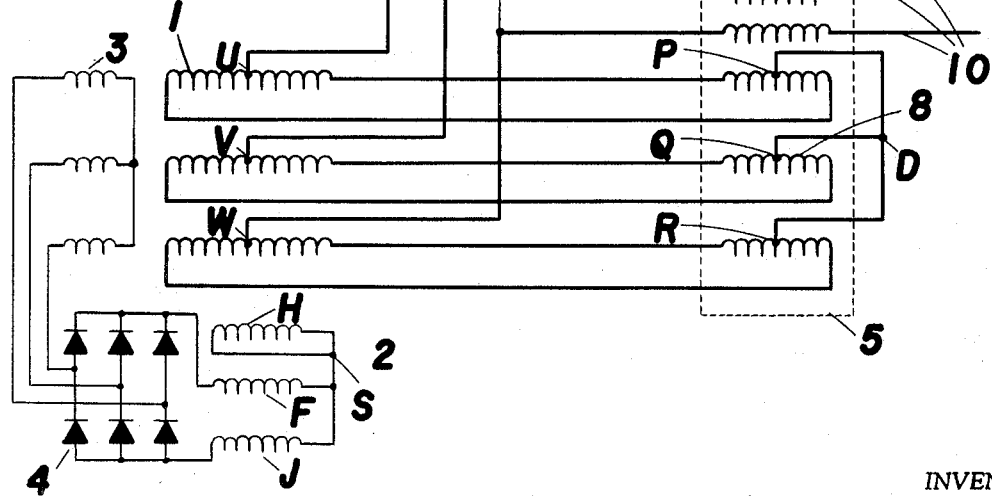

In FIG. 2, windings of the transformer 5 consist of a primary current winding 7, a primary voltage winding 6 and secondary winding 8. The voltage winding 6 is connected electrically with the armature winding 1 of the electric rotating machine through a reactor 9. The terminals U, V, W of the armature winding 1 are connected electrically with the electric wiring 10 through the current winding 7 of the transformer. The use of a regulator is not necessary in this arrangement since the load current flowing in the current winding 7 is directly proportional to load current flowing in the main armature winding 1.

Figure 3:
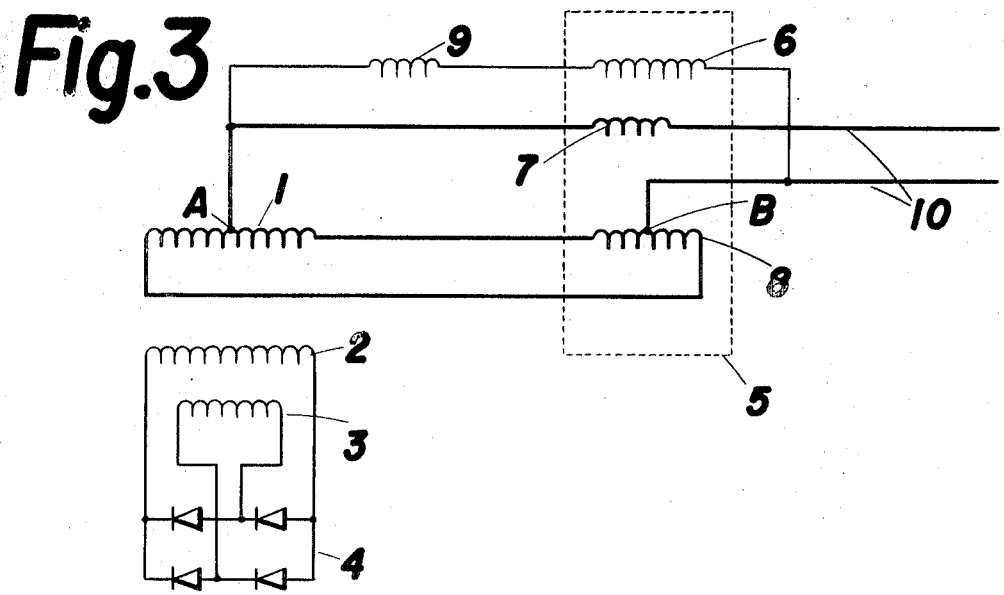
Figure 4:
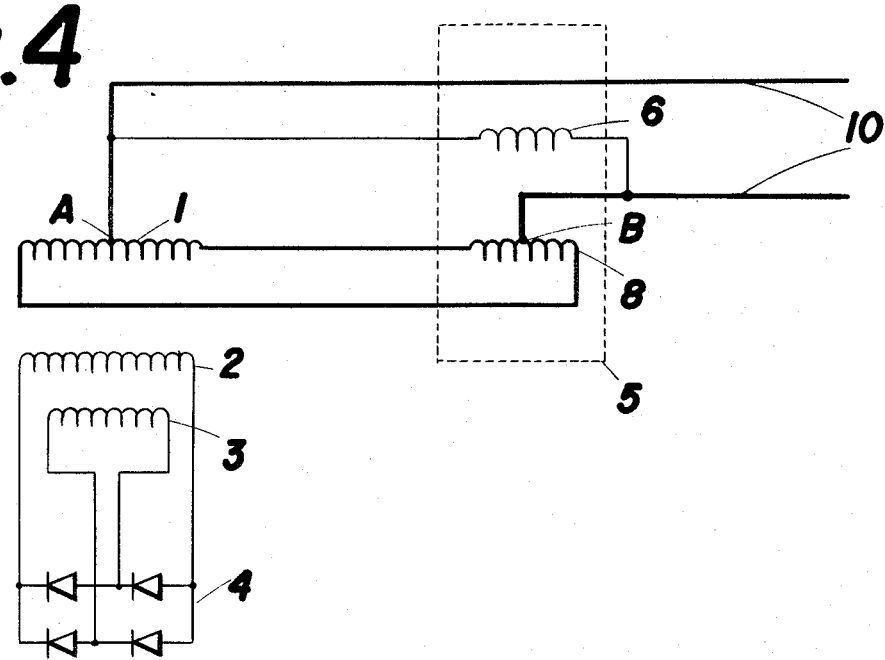

In FIG. 3, a single phase electric rotating machine is shown as the electric rotating machine, and a single phase transformer is used as the transformer. In this case, a middle point A of the armature winding 1 of the single phase electric rotating machine is connected electrically with a line of the electric wiring 10, and a middle point B of the secondary winding 8 of the transformer 5 is connected electrically with another line of the electric wiring 10. Thus, one of the terminals of the primary winding 6 of the transformer 5 is connected electrically with the middle point A of the armature winding 1 of the single phase electric rotating machine, and the other of the terminals of the primary winding 6 of the transformer 5 is electrically connected with the middle point B of the secondary winding 8 of the transformer 5. Although a current winding 7 is provided in the transformer of FIG. 3, there is no current winding in the transformer 5 of FIG. 4. Both the arrangements of FIG. 3 and FIG. 4 can be used as those of synchronous generators and motors. But, FIG. 3 is preferable for synchronous generators.

Figure 5:
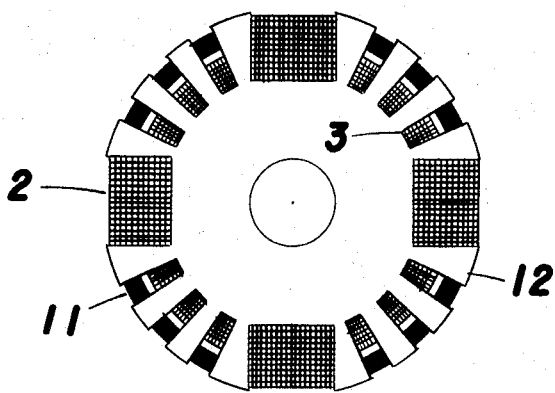
FIG. 5 is a cross-sectional view of a rotor in an arrangement of FIG. 6.
Figure 6:
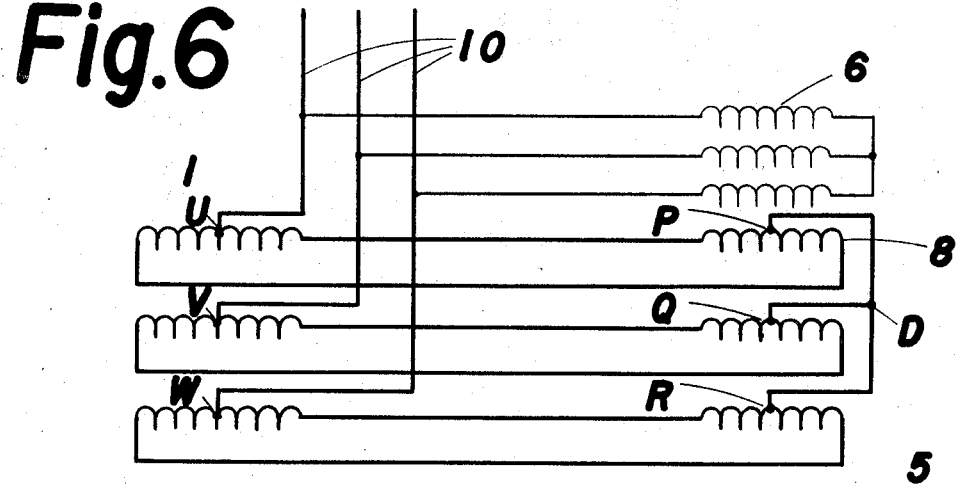
Figure 6:
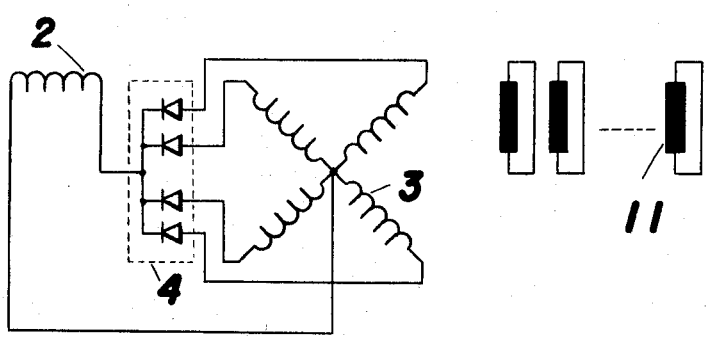

In FIG. 6 and FIG. 5, the rotor is provided with field poles 12, a field winding 2 for the field poles having the number of poles as that of the armature winding 1 of the electric rotating machine obtained by the load current flowing into and out from the middle point U, V, W in each phase of the armature winding 1 of the electric rotating machine, and a damper winding; an exciting secondary winding having the number of poles as that of the armature winding of the electric rotating machine obtained by the current which is made to flow in the armature winding of the electric rotating machine by the electromotive force induced in the secondary winding of the transformer, and comprising conductors located in the same slots as the conductors of the damper winding; and rectifier means 4 mounted on the rotor for supplying unidirectional current flow from the exciting secondary winding 3 to the field winding 2.

Figure 7:
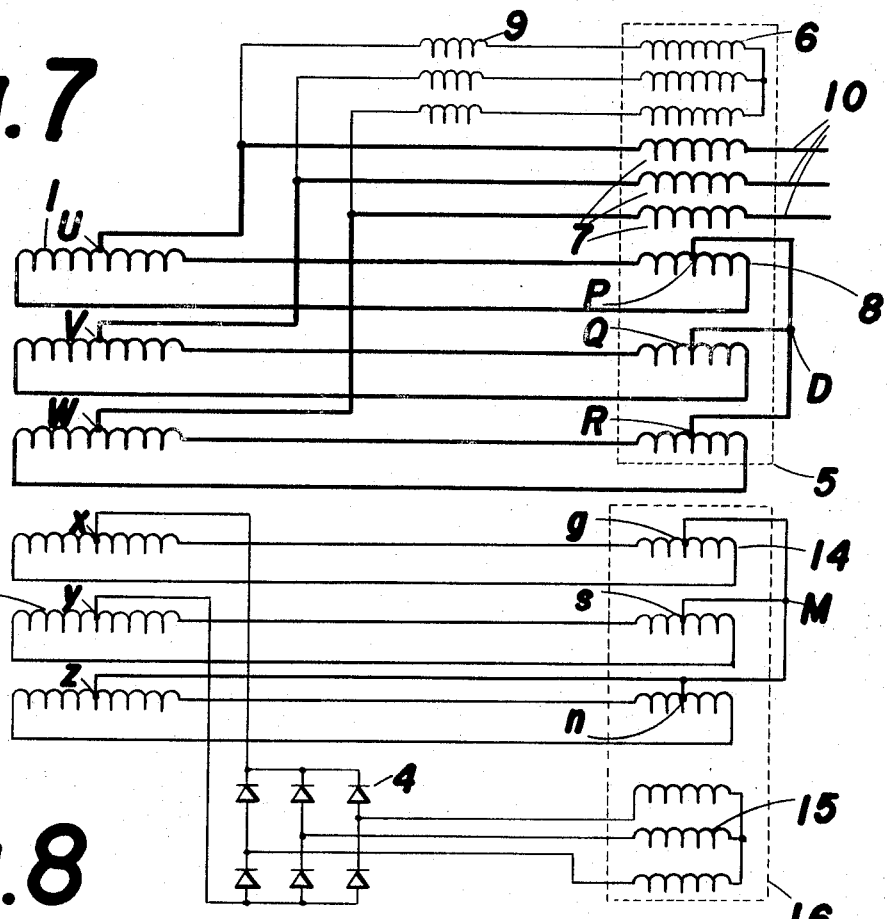

In FIG. 7, the rotor is provided with a multipole rotor winding 13 and a transformer 16 having a primary winding 14 and a secondary winding 15; further, there are an electric circuit in which the said multipole rotor winding 13 is connected electrically in series with the said primary winding 14 of the transformer 16 by connecting electrically in each phase between both terminals of said multipole rotor winding 13 and both terminals of the primary winding 14 of the transformer 16; and an electric connection in each phase between a terminal of the said secondary winding 15 of the transformer 16 and a middle point $x$, $y$, $z$, of the said multipole rotor winding 13 through rectifier means 4. In this case, middle points $g$, $s$, $n$, in each phase primary winding 14 of the transformer 16 are connected electrically with each other.

In the arrangement of FIG. 7, the rectifier 4 and the transformer 16 can be mounted on the rotor. Of course, the rectifier and the transformer may be installed outside the rotor. When the rectifier 4 and the transformer 16 are mounted on the rotor, the electric rotating machine can be brushless construction.

Figure 10:
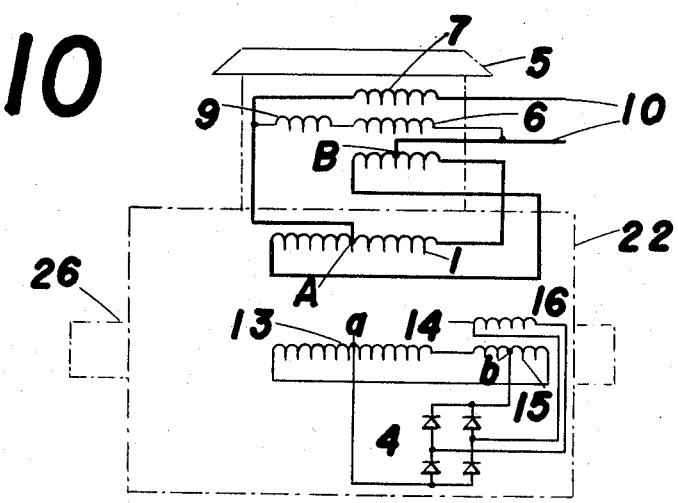

In FIG. 10, a single phase electric rotating machine is shown. The rotor is provided with a multipole rotor winding 13 and a transformer 16 having a primary winding 15 and a secondary winding 14; further, there are: an electric circuit in which the said multipole rotor winding 13 is connected electrically in series with the said primary winding 15 of the transformer 16 by connecting electrically between both terminals of the said multipole rotor winding 13 and both terminals of the said primary winding 15 of the transformer 16, and an electric connection between a terminal of the said secondary winding 14 of the transformer and a middle point $a$ of the said multipole rotor winding 13 through rectifier means 4. One of the DC side terminals of the rectifier 4 is connected electrically with the middle point $a$ of the rotor winding 13, and the other of the DC side terminals of the rectifier 4 is connected electrically with a middle point $b$ of the primary winding 15.

Figure 11:
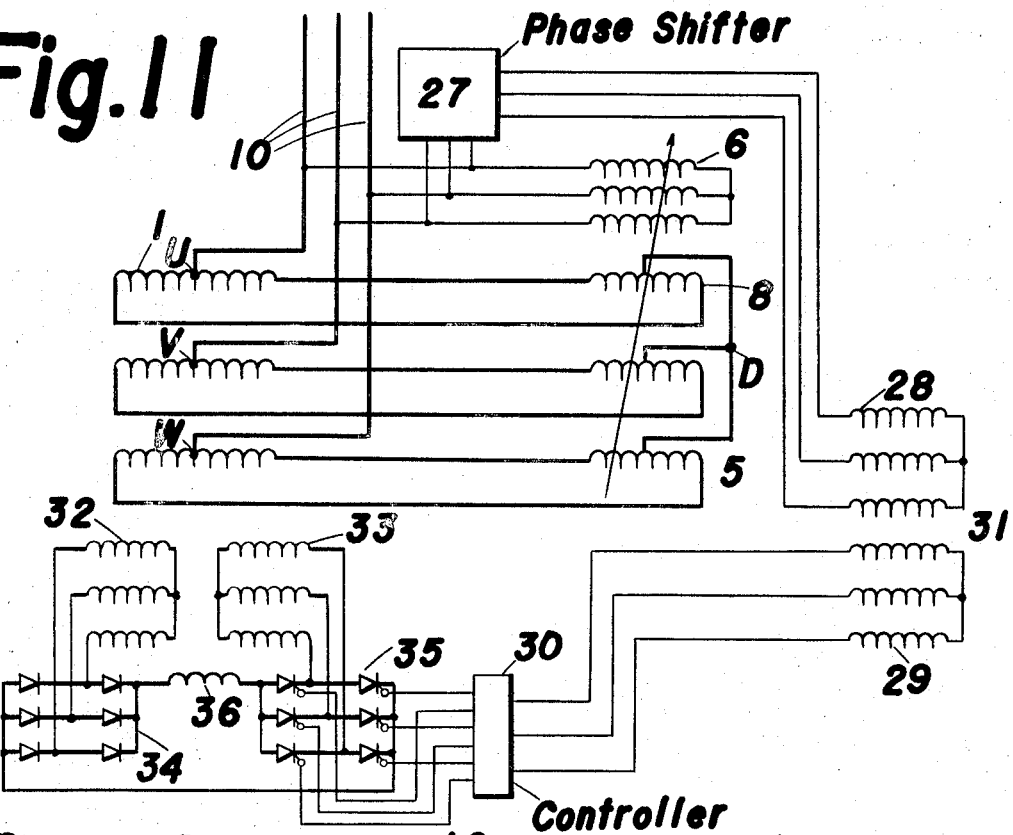

In FIG. 11, the rotor is provided with a first winding 32 and a second rotor winding 33; the first rotor winding 32 comprises conductors mounted in the rotor slots and has the same number of poles as that of the armature winding 1 of the electric rotating machine obtained by a load current flowing into and out from a middle point in each phase of the armature winding of the electric rotating machine; the second rotor winding 33 comprises conductors located in the same slots as the conductors of the first rotor winding and has the same number of poles as that of the armature winding 1 of the electric rotating machine obtained by the current which is made to flow in the armature winding 1 of the electric rotating machine by the electromotive force induced in the secondary winding 8 of the transformer 5; and a frequency converter is connected electrically between the first rotor winding 32 and the second rotor winding 33. In this case, the frequency converter is composed of; a rectifier 34 connected electrically with output terminals of the first rotor winding 32; reactor 36 and an inverter 35 connected electrically in series with the rectifier 34 and connected electrically with input terminals of the second rotor winding 33; and a controller 30 for controlled rectifier 35.

In the arrangement of FIG. 11, controlled rectifier 35 is controlled by a phase shifter through the controller 30 and a synchronizing device 31. The synchronizing device 31 is composed of a primary winding 28 and a secondary winding 29. The primary winding 28 is a stationary winding, and the secondary winding 29 is a rotating winding. The secondary winding 29 rotates with the second rotor winding 33 and has the same poles as the second rotor winding 33. As is found from the electric connection between the electric wiring 10 and the primary winding 6 of the transformer 5, direction of the rotation of the rotating field in the electric rotating machine made by the current flowing directly in the armature winding of the electric rotating machine is opposite to that made by the current which is made to flow in the armature winding of the electric rotating machine by the electromotive force induced in the secondary winding of the transformer 5. The arrangement of FIG. 11 can be used either as that of an induction generator or an induction motor. When used as an induction motor, the speed can be controlled either by adjusting the ratio of the transformer 5 or by adjusting the phase shifter 27. When used as an induction motor, the output frequency of the electric rotating machine can be controlled also by controlling the phase shifter or by controlling the ratio of the transformer 5. When the rectifier 34, the reactor 36, the controlled rectifier 35 and the controller 30 are arranged to rotate with the rotor windings 32 and 33, the electric rotating machine can be a brushless construction. But, these devices including reactor 36, rectifier 34 and the controlled rectifier 35 can be installed outside the rotor.

Figure 12:
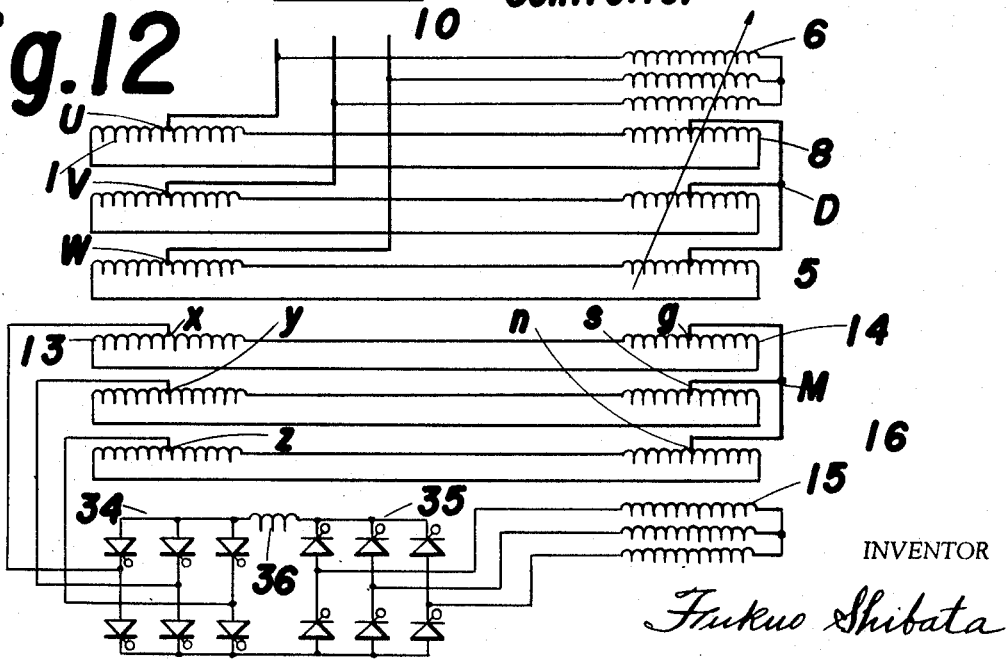

In FIG. 12, the rotor is provided with a multipole rotor winding 13 and a transformer 16 having a primary winding 14 and a secondary winding 15; further, there are: an electric circuit in which the said multipole rotor winding 13 is connected electrically in series with the said primary winding 14 of the transformer 16 by connecting electrically in each phase between both terminals of the said multipole rotor winding and both terminals of the said primary winding 14 of the transformer 16, and an electric connection in each phase between a terminal of the said secondary winding 15 of the transformer 16 and a middle point $x$, $y$, $z$, of the said multipole rotor winding 13 through a frequency converter. In this case, the frequency converter is composed of controlled rectifiers 34, 35 and a reactor 36 and others. In FIG. 12, the controller 30, the synchronizer 31, the phase shifter 27 etc. are not shown in the arrangement, in order to make the drawing simple, although these devices is necessary to install. Middle points $n$, $s$, $g$, in each phase primary winding 14 of the transformer 16 are connected electrically with each other. Symbol M shows the connected point of $n$, $s$, $g$, which becomes a neutral point for the rotor winding 13.

Figure 8:
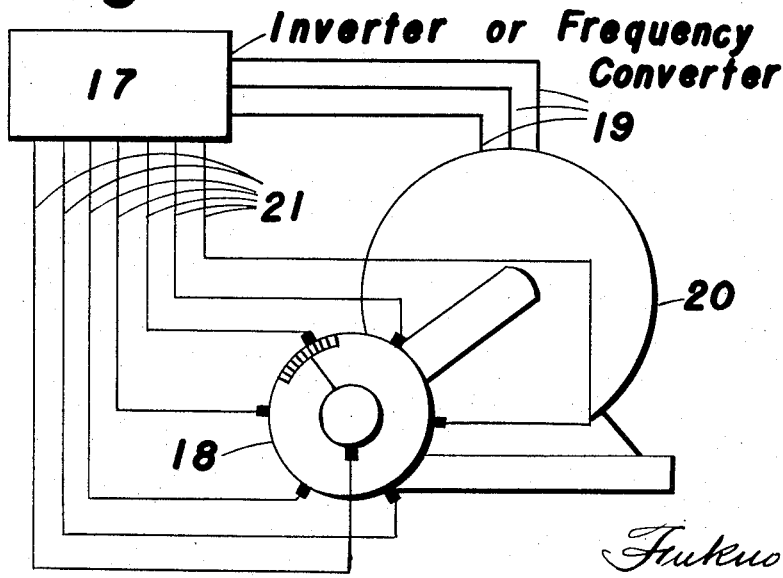
FIG. 8 is a drawing for explanation.
Figure 13:
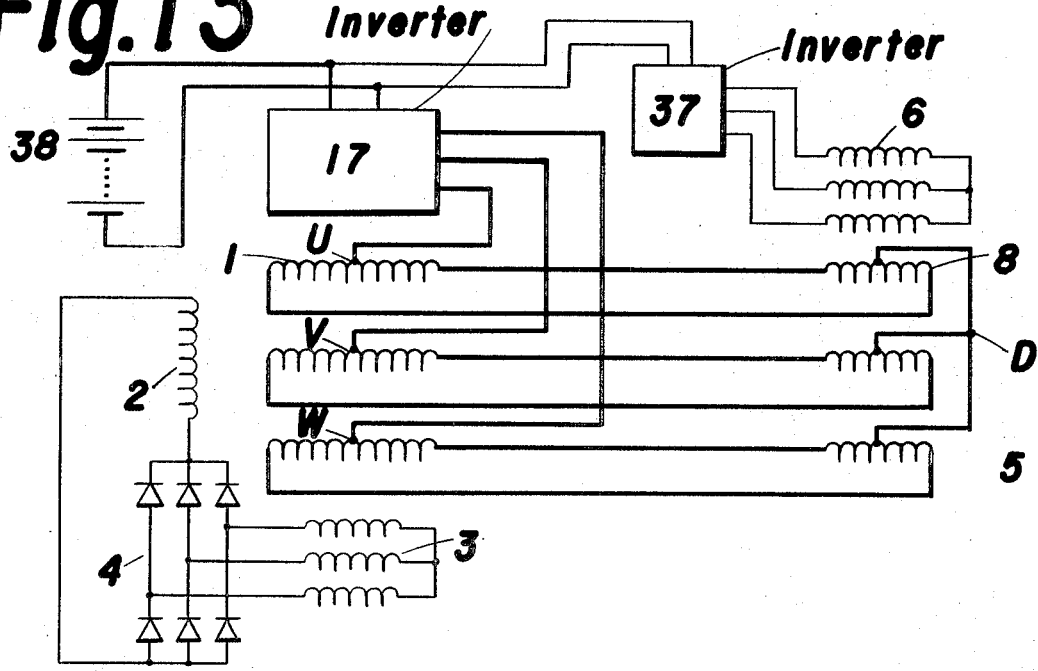

This invention can be applied to an arrangement of a commutatorless motor, as is found from FIG. 13. In FIG. 13, an electrical source 38 which is shown by a symbol of a battery is connected electrically with the terminals U, V, W,—the middle point—of the armature winding 1 of the electric rotating machine through an electric frequency converter 17. In this invention, the electric converter 17 may be an inverter. When the electric source is AC the frequency converter 17 must be an ordinary frequency converter. However, the electric source is DC, the frequency converter 17 must be an inverter, as shown in FIG. 13. It can be considered that an inverter is a kind of a frequency converter, as a DC power can be converted to an AC power by an inverter. The primary winding 6 of the transformer 5 is also connected electrically with the electric source 38 through an inverter 37. The arrangement of FIG. 13 can be understood from an explanation drawing shown in FIG. 8. The electric rotating machine 20 is connected electrically with the inverter or frequency converter 17 through an electric connection 19. The electric rotating machine 20 is also provided with a detector of rotor position 18 on a shaft of the electric machine 20. The inverter of frequency converter 17 can be controlled by a signal obtained by the detector of the rotor position 18. In order to receive the signal from the detector of the rotor position 18, the inverter or frequency converter 17 is connected electrically with the detector 18 through an electric wiring 21. Thus the commutatorless motor can be obtained by the arrangement of FIG. 13 and FIG. 8.

Figure 14:
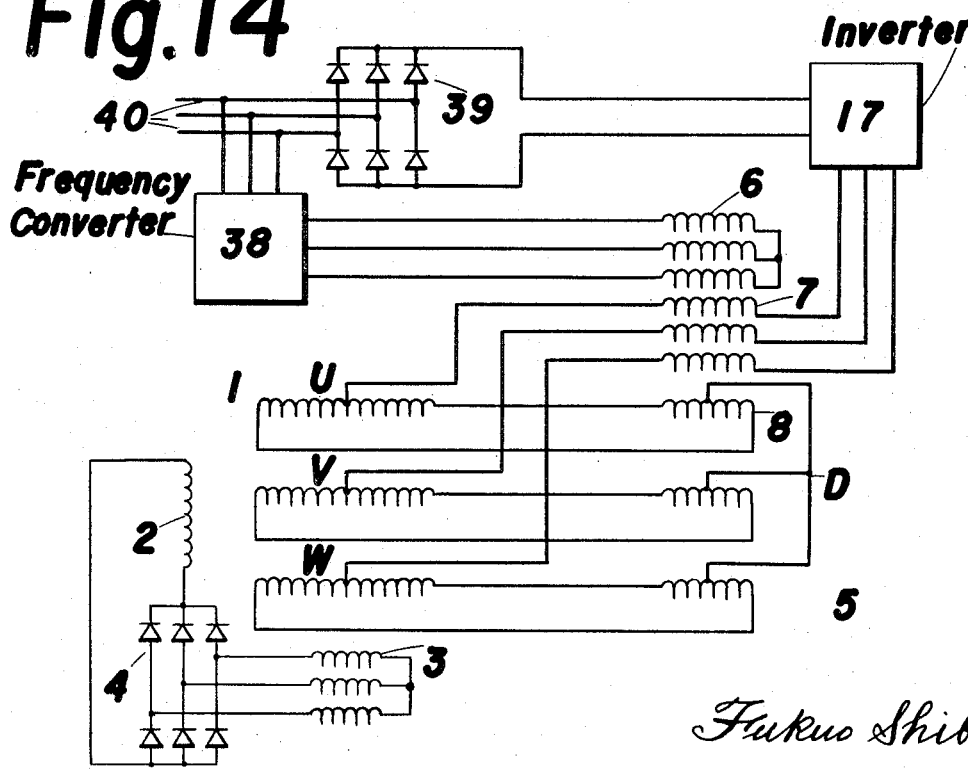

In FIG. 14, the terminals U, V, W, of the commutatorless motor are connected electrically with an AC electric source 40 through a rectifier 39, an inverter 17 and a current primary winding 7 of the transformer 5. The voltage winding 6 of the transformer 5 is connected electrically with the AC electric source 40 through a frequency converter 38. In FIG. 14, the symbol 38 may be a controller only and not a frequency converter.

I claim:

1. An electric machine arrangement which comprises in combination:
   an electric rotating machine having a stator which is provided with an armature winding and having a rotor which is provided with a rotor winding;
   a transformer which has a primary winding and a secondary winding;
   an electric circuit in which the said armature winding of the electric rotating machine is connected electrically in series with the said secondary winding of the transformer by connecting electrically in each phase between both terminals of the said armature winding of the electric rotating machine and both terminals of the said secondary winding of the transformer, so that electric power may be transferred between the said electric rotating machine and the said transformer; and
   an electric connection in each phase between a terminal of the said primary winding of the transformer and a middle point of the armature winding of the said electric rotating machine.

2. An electric machine arrangement which comprises in combination as set forth in claim 1, in which the electric rotating machine is a polyphase winding machine, and the transformer is a polyphase winding transformer, and middle points in each phase secondary winding of the transformer are connected electrically with each other.

3. An electric machine arrangement which comprises in combination as set forth in claim 1, in which a single phase winding machine is used as the electric rotating machine, and a single phase winding transformer is used as the transformer, further, one of the terminals of the primary winding of the transformer is connected electrically with the middle point of the armature winding of the single phase electric rotating machine, and the other of the terminals of the primary winding of the transformer is electrically connected with the middle point of the secondary winding of the transformer.

4. An electric machine arrangement which comprises in combination as set forth in claim 1, in which the rotor is provided with a multipole field winding comprising conductors mounted in the rotor slots, and having the same number of poles as that of the armature winding of the electric rotating machine obtained by a load current flowing into and out from the middle point in each phase of the armature winding of the electric rotating machine; a multipole exciting secondary winding comprising conductors located in the same slots as the conductors of the field winding, and having the same number of poles as that of the armature winding of the electric rotating machine obtained by the current which is made to flow in the armature winding of the electric rotating machine by the electromotive force induced in the secondary winding of the transformer; and rectifier means mounted on the rotor for supplying unidirectional current flow from the exciting secondary winding to the field winding.

5. An electric machine arrangement which comprises in combination as set forth in claim 1, in which the rotor is provided with: field poles, a field winding for the field poles having the number of poles as that of the armature winding of the electric rotating machine obtained by a load current flowing into and out from the middle point in each phase of the armature winding of the electric rotating machine, and a damper winding; an exciting secondary winding having the number of poles as that of the armature winding of the electric rotating machine obtained by the current which is made to flow in the armature winding of the electric rotating machine by the electromotive force induced in the secondary winding of the transformer, and comprising conductors located in the same slots as the conductors of the damper winding; and rectifier means mounted on the rotor for supplying unidirectional current flow from the exciting secondary winding to the field winding.

6. An electric machine arrangement which comprises in combination as set forth in claim 1, in which the rotor is provided with a first rotor winding and a second rotor winding; the first rotor winding comprises conductors mounted in the rotor slots and has the same number of poles as that of the armature winding of the electric rotating machine obtained by a load current flowing into and out from the middle point in each phase of the armature winding of the electric rotating machine; the second rotor winding comprises conductors located in the same slots as the conductors of the first rotor winding and has the same number of poles as that of the armature winding of the electric rotating machine obtained by the current which is made to flow in the armature winding of the electric rotating machine by the electromotive force induced in the secondary winding of the transformer; and a frequency converter is connected electrically between the first rotor winding and the second rotor winding.

7. An electric machine arrangement which comprises in combination as set forth in claim 1, in which an electric source is connected electrically with the middle point in each phase of the armature winding of the electric rotating machine through an electric frequency converter.

8. An electric machine arrangement which comprises in combination as set forth in claim 1, in which windings of the transformer consist of a primary current winding, a primary voltage winding and a secondary winding.

9. An electric machine arrangement which comprises in combination as set forth in claim 1, in which the rotor is provided with a multipole rotor winding and a transformer having a primary winding and a secondary winding; further, there are; an electric circuit in which the said multipole rotor winding is connected electrically in series with the said primary winding of the transformer by connecting electrically in each phase between both terminals of the said multipole rotor winding and both terminals of the said primary winding of the transformer, and an electric connection in each phase between a terminal of the said secondary winding of the transformer and a middle point of the said multipole rotor winding through rectifier means.

10. An electric machine arrangement which comprises in combination as set forth in claim 1, in which the rotor is provided with a multipole rotor winding and a transformer having a primary winding and a secondary winding; further, there are an electric circuit in which the said multipole rotor winding is connected electrically in series with the said primary winding of the transformer by connecting electrically in each phase between both terminals of the said multipole rotor winding and both terminals of the said primary winding of the transformer; and an electric connection in each phase between a terminal of the said secondary winding of the transformer and a middle point of the said multipole rotor winding through a frequency converter.